United States Patent
Masannek et al.

[11] Patent Number: 5,831,807
[45] Date of Patent: Nov. 3, 1998

[54] OVERLOAD AND SHORT CIRCUIT PROTECTION DEVICE FOR A POWER SEMICONDUCTOR CIRCUIT

[75] Inventors: Juergen Masannek; Ernst Schimanek, both of Nuernberg, Germany

[73] Assignee: Semikron Elektronik GmbH, Germany

[21] Appl. No.: 847,681

[22] Filed: Apr. 28, 1997

[30] Foreign Application Priority Data

Apr. 29, 1996 [DE] Germany ............... 196 17 054.0

[51] Int. Cl.$^6$ .................................................. H02H 3/00
[52] U.S. Cl. ........................ 361/93; 361/87; 361/94; 361/100; 363/58; 363/76
[58] Field of Search ................. 361/18, 87, 93–94, 361/98, 100, 101; 363/55, 56, 58, 75–76, 78–81, 97–98

[56] References Cited

U.S. PATENT DOCUMENTS

| | | | |
|---|---|---|---|
| 4,410,935 | 10/1983 | Dang | 363/37 |
| 4,475,150 | 10/1984 | D'Atre et al. | 363/51 |
| 4,586,118 | 4/1986 | Mihalka | 363/17 |
| 5,280,228 | 1/1994 | Kanouda et al. | 318/803 |
| 5,568,373 | 10/1996 | Small | 363/132 |
| 5,570,254 | 10/1996 | Spilger et al. | 361/18 |

*Primary Examiner*—Jeffrey A. Gaffin
*Assistant Examiner*—Michael J. Sherry
*Attorney, Agent, or Firm*—Morrison Law Firm

[57] ABSTRACT

An overcurrent and short circuit protection device for a power semiconductor component is responsive to output current signals representing the actual output current(s) of the semiconductor component. A short-circuit window comparator receives the output current signals and produces an error signal when the sum of all output current signals is less than a minimum allowable value or more than a maximum allowable value. An overcurrent window comparator receives the same output current signals, determines a positive maximum instantaneous value and a negative maximum instantaneous value, and produces an error signal when either one of these exceeds a maximum allowable value. An error signal from either window comparator interrupts operation of the power semiconductor component and locks out all higher level control signals to the power semiconductor component.

21 Claims, 3 Drawing Sheets

OVERLOAD AND SHORT CIRCUIT PROTECTION DEVICE FOR A POWER SEMICONDUCTOR CIRCUIT

BACKGROUND OF THE INVENTION

The present invention relates to overcurrent and short-circuit protection for power semiconductor devices. More specifically, the present invention is an overcurrent and short-circuit protection device for power semiconductor switching circuit arrangements. The present invention is described using the example of a converter circuit consisting of IGBT or MOS power semiconductor switches.

A German prior art reference DE 42 42 569 A1 describes a power semiconductor overcurrent protection device which is known in the art. To protect against an overcurrent, this prior art device detects the current flowing through the power semiconductor device. The current detection device consists of a circuit element with a control electrode and other components for detecting a current flowing through the power semiconductor circuit element. As described in the prior art reference, this arrangement protects the free-running diodes against overcurrents that may occur by disabling the semiconductor when an overcurrent condition is detected.

In the prior art, short-circuit protection is accomplished separately from the overcurrent protection using voltage monitors which monitor voltage across the power semiconductor switch devices. When used to protect an IGBT circuit configuration, the $V_{CE}$ is monitored. When used to protect a MOS circuit configuration, the $V_{DS}$ is monitored. Both voltage monitoring methods require a considerable amount of complicated control circuitry and are very temperature-dependent. The protection they provide is costly and it is limited to voltage drop resulting from short-circuits.

Referring to FIG. 1, the prior art short-circuit protection device includes a circuit breaker 106, which is either an IGBT or a MOSFET power semiconductor switch, connected into a circuit arrangement. The saturation voltage 108, 109, i.e. the voltage drop via the collector/emitter path in the case of IGBT or the drain/source path in the case of MOSFET, depends on the current flowing through the device. But it also depends on the temperature of the components.

The saturation voltage 108, 109, measured via $V_{CE}$ or $V_{DS}$, is the input to a saturation voltage detection unit 110. An output signal 113 is transmitted from saturation voltage detection unit 110 to a comparator 102. A maximum voltage drop signal 111, associated with the maximum permissible current through circuit breaker 106, is transmitted from a controller (not shown) to another input of comparator 102. If the output signal 113 of saturation voltage detection 110 exceeds maximum voltage drop signal 111, an error signal 114 is transmitted to switch control circuit 116. Error signal 114 causes switch control circuit 116 to override any control command 118 transmitted by a microprocessor 112, and to interrupt the current flow of circuit breaker 106.

The saturation voltage 108, 109 of power semiconductor devices is greatly temperature-dependent. That is, a maximum saturation voltage drop $U_{max}$ at constant current is reached at a first temperature d1, and a minimum saturation voltage drop $U_{min}$ is reached at a second temperature d2. The absolute values of d1 and d2 depend on the type of power semiconductor in circuit breaker 106. First temperature d1 can be greater as well as smaller than second temperature d2.

In general, overcurrent and short-circuit protection are designed with two main objectives. First, they must protect the device from damage caused by overcurrents or short circuits which may occur in the device. Secondly, they must also be designed to avoid unnecessarily shutting down the devices which they are protecting. More specifically, maximum voltage drop 111, generated by the control circuit (not shown), must be proportional to the maximum permissible device current. However, since saturation voltage 108, 109 is temperature dependent, the control circuit must generate maximum voltage drop 111 in such a way that maximum saturation voltage drop $U_{max}$ occurring at first temperature d1 does not produce error signal 14, but that voltage occurring at second temperature d2 does produce error signal 114 which in turn triggers the safe deactivation of gate voltage 115.

The greatest disadvantage of the temperature dependence of the saturation voltage is that the resulting saturation current associated with the highest saturation voltage can be up to 50% higher than the current at the lowest saturation voltage. The high saturation current leads to higher overvoltages during deactivation. The higher overvoltages can exceed the maximum permissible operating voltage of the device being protected, which in turn may lead to the destruction of the circuit arrangement.

In addition to the overvoltage problem during deactivation, the control circuit must suppress the operation of saturation voltage detection unit 110 for the duration of a stabilization period after an activation signal is applied to the semiconductor device. Otherwise an overcurrent would be detected during each activation. Even when the power semiconductor component is activated by a control signal with indefinite steepness, the voltage across the collector/emitter path (or the Drain/source path in the case of MOSFET) drops at a finite steepness (e.g. 5 kV/$\mu$s). Therefore, to avoid nuisance trips of the device during the activation of the device, a time delay must be installed which disconnects the saturation voltage detection unit 110 during the stabilization period of the semiconductor device following the activation signal. For example, a delay of 100 ns is adequate for a voltage of 500 V. The saturation voltage detection unit 110 must be blanked out for that time delay period, since saturation voltage detection unit 110 would otherwise erroneously detect an overcurrent. The current flowing through circuit breaker 6 also rises with finite steepness, e.g. at 1000 A/$\mu$s during a short circuit, which would lead to a rise of 100 A in current amplitude, which in turn would increase the effect of the overvoltage caused by the current flow.

Because of the strong temperature dependence of saturation voltage, the short-circuit protection according to prior art can not simultaneously provide overcurrent protection. Overcurrent protection must be accomplished by the separate additional monitoring of other values.

In a typical converter or DC rectifier, the output current values are detected by current sensor transformers (current sensors) and transmitted back to the converter control circuit in a feedback loop to control the output of the converter. For example, the output current value can be a voltage proportional to the current. The current sensor data include exact deactivation thresholds, which are subject to a time lag because they are processed in overlapping systems. The inherent time lag is not long enough to affect overcurrent protection. However, the periods of time which elapse (e.g. about 10 $\mu$s in an IGBT) in deactivating the circuit arrangement are too long to provide effective short-circuit protection for the circuit arrangement.

In view of the above, the prior art shows that to provide both short circuit protection and overcurrent protection, two types of monitoring are required as well as two separate control systems. The customary short-circuit protection according to prior art in the form of a $V_{CE}$ or $V_{DS}$ monitor (saturation voltage detection unit 110) shown in FIG. 1 is costly and must be implemented separately for every individual power semiconductor component 106. Because of the large dependence of the saturation voltage of a power semiconductor device on the temperature of the device, this customary short-circuit protection can not be used for overcurrent protection. Likewise, the customary overcurrent protection can only be used to protect against overcurrent and not against short circuits because of the inherent time lag associated with the current sensors. In practice, according to prior art, both types of protection devices, $V_{CE}$ ($V_{DS}$) monitors and current monitors, are used in combination, which results in high costs.

OBJECTS AND SUMMARY OF THE INVENTION

It is an objective of the present invention to overcome the problems of the prior art.

It is another objective of this invention to provide a short circuit and overcurrent protection device which uses only actual current signals to protect a device against short circuits and overcurrents.

It is yet another objective of the present invention to provide an economic overcurrent and short-circuit protector for power IGBT and MOSFET switch circuit arrangements in the form of overcurrent limitation, which reliably protects against ground faults (short circuits) and overcurrents at a low additional cost.

In the present invention, the current sensors, required and provided in the present invention circuit arrangements for overlapping controls at the output of every half-bridge, detect when the permissible current is exceeded. As soon as the current of a half-bridge lies outside the defined limits, e.g. at 125% of the nominal current of an IGBT or MOSFET power semiconductor component, the control signals for the circuit breakers on the primary side are disabled. The disabling of the control signals deactivates the bottom switches at staggered intervals in relation to top switches. The circuit according to the invention can detect terminal short circuits, ground faults and overcurrents. As a result, an economically advantageous circuit protection arrangement is provided.

Briefly stated, an overcurrent and short circuit protection device for a power semiconductor component is responsive to output current signals representing the actual output current(s) of the semiconductor component. A short-circuit window comparator receives the output current signals and produces an error signal when the sum of all output current signals is less than a minimum allowable value or more than a maximum allowable value. An overcurrent window comparator receives the same output current signals, determines a positive maximum instantaneous value and a negative maximum instantaneous value, and produces an error signal either one of these exceeds a maximum allowable value. An error signal from either window comparator opens the power semiconductor component and locks out all higher level control signals to the power semiconductor component.

According to an embodiment of the present invention, there is disclosed, a device for overcurrent and short-circuit protection of a power semiconductor device, comprising: at least one current detector connected to transmit a current signal responsive to an output current of said power semiconductor device, a first window comparator connected to receive said current signal and to transmit a first error signal when said current signal is above a first threshold value or below a second threshold value, a second window comparator connected to receive said current signal and to transmit a second error signal when a maximum positive instantaneous value of said current signal is greater than a third threshold value or when a maximum negative instantaneous value of said current signal is greater than a fourth threshold value, and a switch connected to interrupt operation of said semiconductor device responsively to said first error signal and said second error signal.

According to another embodiment of the present invention, there is disclosed, a device for overcurrent and short-circuit protection of at least one power semiconductor device, comprising: current detectors connected to detect current values of output currents of said at least one power semiconductor device, a first comparator device connected to receive said current values and to compare a sum of said current values to a first threshold value and a second threshold value, a second comparator device connected to receive said current values and to compare a maximum positive instantaneous value of said current values with a third threshold value and a maximum negative instantaneous value of said current values with a fourth threshold value, an error signal generator connected to transmit an error output signal responsive to said first comparator device and said second comparator device, and circuit interrupters connected to receive said error output signal and to interrupt an operation of said at least one power semiconductor device responsive to said error signal generator.

According to another embodiment of the present invention, there is disclosed, a control device for providing overcurrent and short-circuit protection of at least one semiconductor device, comprising: a controller signally connected to said at least one power semiconductor device such that said at least one power semiconductor device selectively turns on and turns off responsively to signals generated by said controller, said at least one power semiconductor device having at least one output terminal, a current sensor connected in series with said at least one output terminal, said current sensor connected to transmit current signals responsive to output currents of said at least one power semiconductor device, a first circuit device connected to receive said current signals and transmit a first output signal when a sum of said current signals is greater than a first threshold value or lower than a second threshold value, a second circuit device connected to receive said current signals and transmit a second output signal when a maximum positive instantaneous value of said current signals is greater than a third threshold value or a maximum negative instantaneous value of said current signals is greater than a fourth threshold value, an error signal generator connected to receive said first output signal and said second output signal and to transmit an error output signal responsive to said first circuit device and said second circuit device, and at least one circuit interrupter connected to interrupt operation of said at least one power semiconductor device responsive to said error signal generator.

According to another embodiment of the present invention, there is disclosed, a device for short-circuit protection of at least one power semiconductor device, comprising: at least one current detector connected to detect current values of outputs of said at least one power semiconductor device, a short-circuit comparator device connected to receive said current values and transmit a first output signal when a sum of said current values exceeds a maximum threshold value or when said sum is less than a minimum threshold value, an error signal generator connected to receive said first output signal and to transmit an error output signal responsive to said short-circuit comparator device, and a circuit interrupter connected receive said error output signal and to interrupt operation of said at least one power semiconductor device responsive to said error signal generator.

According to another embodiment of the present invention, there is disclosed, an overcurrent and short-circuit protection device for at least one power semiconductor device, comprising: means for detecting currents at an output of said at least one semiconductor device, first means for outputting a first error signal when a sum of said currents is greater than a first threshold value or less than a second threshold value, second means for outputting a second error signal when a maximum positive instantaneous value of said currents is greater than a third threshold value or when a maximum negative instantaneous value is greater than a fourth threshold value, means for interrupting operation of said power semiconductor device responsively to said first error signal and said second error signal.

According to yet another embodiment of the present invention, there is disclosed, an overcurrent and short-circuit protection device for at least one power semiconductor device, comprising: a current detector operatively connected to detect output currents of said at least one semiconductor device and transmit current signals responsively to said output currents, a first circuit operatively connected to receive said current signals and to transmit a first error signal when a positive maximum instantaneous value of said current signals exceeds a first threshold value or when a negative maximum instantaneous value of said current values exceeds a second threshold value, a second circuit operatively connected to receive said current signals and to transmit a second error signal when a sum of said current signals is less than a minimum threshold value or more than a maximum threshold value, and a switch operatively connected to receive said first error signal and said second error signal and to interrupt an operation of said at least one semiconductor device responsive to said first circuit and said second circuit.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
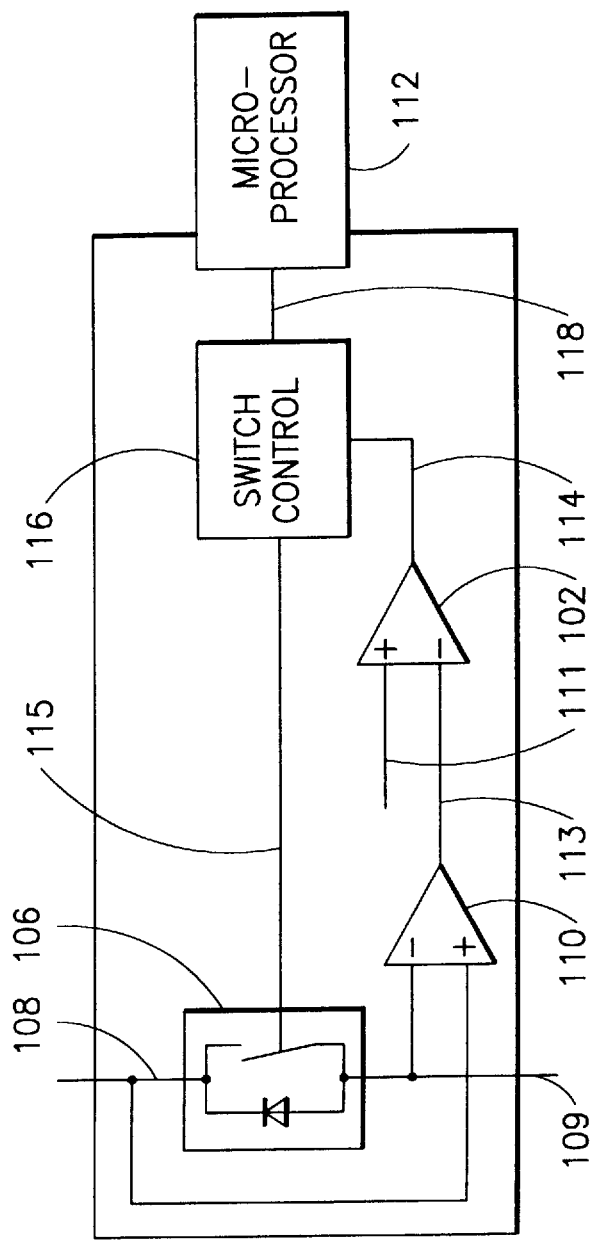
FIG. 1 is a schematic diagram of a prior art short circuit protection device.
Figure 2:
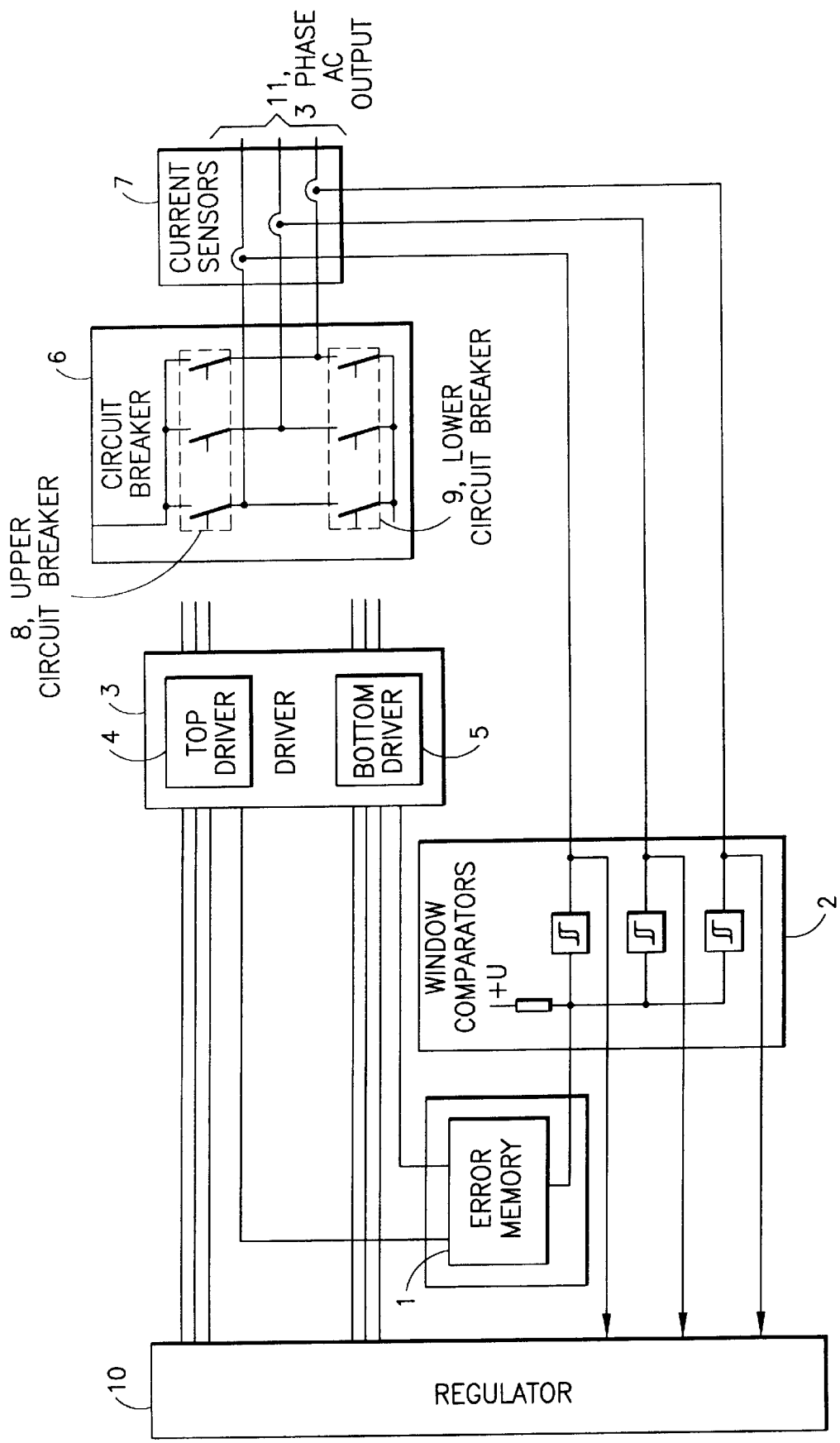
FIG. 2 is a block diagram of an embodiment of the combined short-circuit and overcurrent protection of the present invention.

Referring to FIG. 2, the output portion of a DC/AC converter, which includes the preferred embodiment of the present invention, includes a driver 3 which transmits control signals to a circuit breaker 6. The control signals selectively open and close upper circuit breakers 8 and lower circuit breakers 9 in circuit breaker 6 to generate a three-phase AC output 11. Current sensors 7 are connected to each phase of three-phase AC output 11 on the load side of circuit breaker 6. Based on the feedback of actual output current values transmitted by current sensors 7 and a desired output curve, regulator 10 controls driver 3 which in turn controls circuit breaker 6 to produce the desired three-phase AC output 11 of the converter. Current sensors 7 also transmit the actual output current values to window comparators 2. Window comparators 2 transmit an error signal to an error memory 1 if any one of the currents sensors 7 senses a value outside of an allowed current value range. Error memory I sums the error signals transmitted by window comparators 2 and transmits the error signal to driver 3. Driver control 3 includes a TOP Driver 4 and a BOTTOM Driver 5, which safely deactivate upper circuit breakers 8 and lower circuit breakers 9 within circuit breaker 6 in response to the error signal and override the control signals transmitted by regulator 10.

By keeping the command path short, ie. by minimizing the number of control elements, a very short time interval is realized between the time an overcurrent or short-circuit condition occurs and the time that circuit breaker 6 is opened in response to that occurrence. If we assume a period of 0.5 $\mu$s for acceptance, processing and transmission of the signals in error memory 1, window comparator 2, driver 3, and in circuit breaker 6 and an evaluation period of 1 $\mu$s in current sensors 7, the result is a maximum time delay of less than 3 $\mu$s for the total process of opening the circuit breaker 6 when the overcurrent is too high or when a short circuit occurs. This period will always be short enough to protect the circuit breaker 6 from being destroyed by excessive demand. Bridge short circuits, which are caused when upper circuit breakers 8 and lower circuit breakers 9 are activated at the same time, are eliminated by a higher-level control circuit through locking or similar measures. The higher level control circuit is also described in more detail below.

The principle of rapid overcurrent or short-circuit evaluation shown here by example of an 3-phase DC/AC converter, applies analogously to other types of converters, DC regulators, and any other types of electronic equipment which uses power semiconductor elements. Although power semiconductor elements are normally used as switches, the overcurrent and short-circuit protection applies to all uses, since different uses of a component to not alter the current withstand capabilities of the components.

Figure 3:
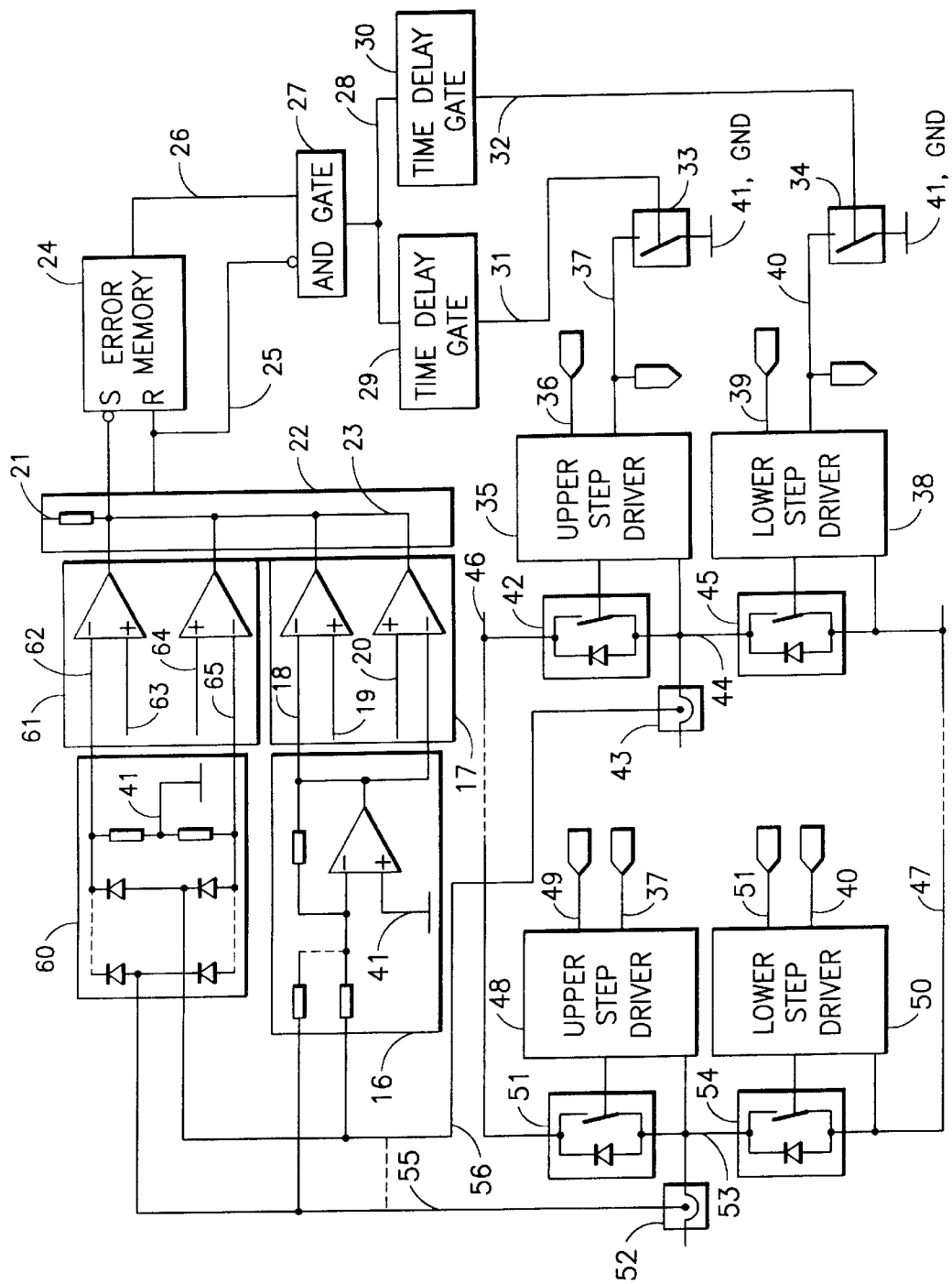
FIG. 3 is a schematic diagram of the embodiment shown in FIG. 2.

Referring now also to FIG. 3, which shows a more detailed description of the components used in two of the phases of the output circuit described above, circuit breaker 6 includes first lower circuit breaker 45, second lower circuit breaker 54, first upper circuit breakers 42, and second upper circuit breaker 51. The circuit breakers can be either IGBT or MOSFET half bridge type power semiconductor switches. Each of first upper circuit breaker 42 and second upper circuit breaker 51 is connected to a positive intermediate circuit voltage 46 and each of first lower circuit breakers 45 and second lower circuit breaker 54 is connected to a negative intermediate circuit voltage 47. First lower circuit breaker 45 is connected to first upper circuit breaker 42 at first breaker output 44 and second lower circuit breaker 54 is connected to second upper circuit breakers 51 at second breaker output 53. Current detectors 43 and 52 are connected in series at first breaker output 44 and second breaker output 53, respectively. Current detectors 43, 52 are used for overlapping regulation by regulator 10 of the converter and are therefore required to be of high basic accuracy and have a low degree of dependence on temperature.

Top driver 4, shown in FIG. 2, includes first and second upper step drivers 35 and 48 which correspond to first upper circuit breaker 42 and second upper circuit breaker 51, respectively. Bottom driver 5, shown in FIG. 2, includes first and second lower step drivers 38 and 50 which correspond to first lower circuit breaker 45 and second lower circuit breaker 54, respectively. Control signals 36, 39, 49, 51 for the overlapping regulation are transmitted by regulator 10 to suitable step drivers 35, 38, 48, 50, respectively, to the control the power semiconductor switches (first lower circuit breaker 45, second lower circuit breaker 54, first upper circuit breakers 42, and second upper circuit breaker 51). Each control signal 36, 39, 49, and 51 can be disabled by removing a TopEnable input signal 37 from first and second upper step drivers 35 and 48 and by removing a BotEnable input signal 40 from first and second lower step drivers 38 and 50. When TopEnable input signal 37 and BotEnable input signal 40 are removed, the individual control signals 36, 39, 49, and 51 are disconnected from first and second upper step drivers 35 and 48 and first and second lower step drivers 38 and 50, respectively, by internal switches (not shown) in first and second upper step drivers 35 and 48 and first and second step drivers 38 and 50. That is, when TopEnable input signal 37 and BotEnable input signal 40 are removed, control signals 36, 39, 49, and 5 1 transmitted from regulator 10 to circuit breaker 6 are overridden.

Actual current values 55, 56 obtained from current detectors 43 and 52 of the outputs of circuit breaker 6 are used directly for overcurrent and short-circuit protection. A reference ground 41 of the measured values is separated by potential from the values of first and second breaker outputs 44 and 53. The reference ground 41 can also be separated from positive intermediate circuit voltage 46 and negative intermediate circuit voltage 47, although this is not absolutely necessary.

For detecting the overcurrent, an n-fold bridge rectifier 60 receives actual current values 55, 56 and determines a positive maximum instantaneous value 62 and a negative maximum instantaneous value 65. Positive maximum instantaneous value 62 and negative maximum instantaneous value 65 are then compared with a positive maximum amplitude 63 and a negative maximum amplitude 64 by an overcurrent window comparator 61.

For ground fault protection, ie. short circuit protection, actual current values 55, 56 are received by a summation amplifier 16. A sum of all output currents 18 is transmitted from summation amplifier 16 to a short circuit window comparator 17. Short circuit window comparator 17 determines whether the sum of all output currents 18 exceeds a maximum threshold 19 or falls short of a minimum threshold 20.

The window comparator outputs 23 of overcurrent window comparator 61 and short circuit window comparator 17 are transmitted to an error memory 24 by a Wired-Or gate 22 or another type of OR gate. Error memory transmits an error output signal 26 when any of positive maximum instantaneous value 62, negative maximum instantaneous value 65, or the sum of all output currents 18 falls outside its allowable range of values. Error output signal 26 can be reset by a reset signal 25. Alternatively, error memory 24 can also be provided with a monostable time interval which does not require reset signal 25.

Error output signal 26 is transmitted to an AND gate 27. An AND gate output 28 of AND gate 27 is transmitted to control inputs of switches 33 and 34. A first time delay gate 29 and a second time delay gate 30 are connected between AND gate output 28 and switches 33 and 34, respectively. First time delay 29 is always unlike second time delay 30.

When error signal 26 and reset signal 25 are not present, switches 33 and 34 are closed, and power semiconductor switches of circuit breaker 6 are controlled by regulator 10. As soon as error output signal 26 is generated, first time delay 29 and second time delay 30 open switches 33 and 34 at staggered intervals. The opening of switches 33 and 34 disables circuit breakers 42, 45, 51, 54. Control signals 36, 39, 49, and 51 transmitted by regulator 10 are now without effect. The combined time delay of all components of the circuit breakers (current detection, overcurrent detection until the circuit breakers are deactivated) occurs in every case within a time which each power semiconductor switch (first lower circuit breaker 45, second circuit breaker 54, first upper circuit breakers 42, and second upper circuit breaker 51) survives without destruction.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for overcurrent and short-circuit protection of a power semiconductor device, comprising:

at least one current detector connected to transmit a current signal responsive to an output current of said power semiconductor device;

a first window comparator connected to receive said current signal and to transmit a first error signal when said current signal is above a first threshold value or below a second threshold value;

a second window comparator connected to receive said current signal and to transmit a second error signal when a maximum positive instantaneous value of said current signal is greater than a third threshold value or when a maximum negative instantaneous value of said current signal is greater than a fourth threshold value; and a switch connected to interrupt operation of said semiconductor device responsively to said first error signal and said second error signal.

2. The device of claim 1, wherein said first window comparator includes a summation amplifier and a first comparator.

3. The device of claim 1, wherein said second window comparator includes an n-fold bridge rectifier and a second comparator.

4. The device of claim 3, wherein said first window comparator includes a summation amplifier and a first comparator.

5. The device of claim 4 further including an error signal generator connected to receive said first error signal and said second error signal and to transmit an error output signal responsively to said first error signal and said second error signal.

6. The device of claim 5, wherein said current sensors require 1 $\mu$s for acceptance, processing, and transmission of signals and each of said summation amplifier, said first comparator, said n-fold bridge rectifier, said second comparator, said error signal generator, and said circuit interrupters require less than 0.5 $\mu$s for acceptance, processing, and transmission of signals.

7. A device for overcurrent and short-circuit protection of at least one power semiconductor device, comprising:

current detectors connected to detect current values of output currents of said at least one power semiconductor device;

a first comparator device connected to receive said current values and to compare a sum of said current values to a first threshold value and a second threshold value;

a second comparator device connected to receive said current values and to compare a maximum positive instantaneous value of said current values with a third threshold value and a maximum negative instantaneous value of said current values with a fourth threshold value;

an error signal generator connected to transmit an error output signal responsive to said first comparator device and said second comparator device; and circuit interrupters connected to receive said error output signal and to interrupt an operation of said at least one power semiconductor device responsive to said error signal generator.

8. The control device of claim 7, wherein:

said at least one power semiconductor device includes a first half-bridge power semiconductor switch and a second half-bridge power semiconductor switch; and one of said circuit interrupters is connected to interrupt an operation of said first half-bridge power semiconductor switch and another one of said circuit interrupters is connected to interrupt an operation of said second half-bridge power semiconductor switch.

9. The control device of claim 8, further including:

a first signal time delay connected between said error signal generator and said one of said circuit interrupters;

a second signal time delay connected between said error signal generator and said another one of said circuit interrupters; and said first signal time delay and said second signal time delay are always unequal such that a first circuit interruption by said one of said circuit interrupters always occurs at a different time than a second circuit interruption by said another one of said circuit interrupters is staggered.

10. The control device of claim 9, wherein:

said first comparator device includes a summation amplifier and a first comparator; and said second comparator device including an n-fold bridge rectifier and a second comparator.

11. The control device of claim 10, wherein said current sensors require 1 $\mu$s for acceptance, processing, and transmission of signals and each of said summation amplifier, said first comparator, said n-fold bridge rectifier, said second comparator, said error signal generator, and said circuit interrupters require less than 0.5 $\mu$s for acceptance, processing, and transmission of signals.

12. A control device for providing overcurrent and short-circuit protection of at least one semiconductor device, comprising:

a controller signally connected to said at least one power semiconductor device such that said at least one power semiconductor device selectively turns on and turns off responsively to signals generated by said controller;

said at least one power semiconductor device having at least one output terminal;

a current sensor connected in series with said at least one output terminal;

said current sensor connected to transmit current signals responsive to output currents of said at least one power semiconductor device;

a first circuit device connected to receive said current signals and transmit a first output signal when a sum of said current signals is greater than a first threshold value or lower than a second threshold value;

a second circuit device connected to receive said current signals and transmit a second output signal when a maximum positive instantaneous value of said current signals is greater than a third threshold value or a maximum negative instantaneous value of said current signals is greater than a fourth threshold value;

an error signal generator connected to receive said first output signal and said second output signal and to transmit an error output signal responsive to said first circuit device and said second circuit device; and at least one circuit interrupter connected to interrupt operation of said at least one power semiconductor device responsive to said error signal generator.

13. The device of claim 12, wherein:

said first circuit device includes a summation amplifier and a first comparator; and said second circuit device includes an n-fold bridge rectifier and a second comparator.

14. A device for short-circuit protection of at least one power semiconductor device, comprising:

at least one current detector connected to detect current values of outputs of said at least one power semiconductor device;

a short-circuit comparator device connected to receive said current values and transmit a first output signal when a sum of said current values exceeds a maximum threshold value or when said sum is less than a minimum threshold value;

an error signal generator connected to receive said first output signal and to transmit an error output signal responsive to said short-circuit comparator device; and a circuit interrupter connected receive said error output signal and to interrupt operation of said at least one power semiconductor device responsive to said error signal generator.

15. The device of claim 14, further including an overcurrent protection device for said at least one semiconductor device, wherein;

said overcurrent protection device includes an overcurrent comparator device connected to receive said current values and to transmit a second output signal when a maximum positive instantaneous value of said current values is greater than a first threshold value or when a maximum negative instantaneous value of said current values is less than a second threshold value;

said error signal generator connected to receive said second output signal and transmit said error output signal responsive to said overcurrent comparator device.

16. An overcurrent and short-circuit protection device for at least one power semiconductor device, comprising:

means for detecting currents at an output of said at least one semiconductor device;

first means for outputting a first error signal when a sum of said currents is greater than a first threshold value or less than a second threshold value;

second means for outputting a second error signal when a maximum positive instantaneous value of said currents is greater than a third threshold value or when a maximum negative instantaneous value is greater than a fourth threshold value;

means for interrupting operation of said power semiconductor device responsively to said first error signal and said second error signal.

17. The overcurrent and short-circuit protection device of claim 16 wherein:

said first means for outputting includes an n-fold bridge rectifier and a first comparator; and said second means for outputting includes a summation amplifier and a second comparator.

18. The overcurrent and short-circuit protection device of claim 17, wherein said means for detecting requires 1 $\mu$s for acceptance, processing, and transmission of actual current signals and each of said summation amplifier, said first comparator, said n-fold bridge rectifier, said second comparator, and said means for interrupting require less than 0.5 $\mu$s for acceptance, processing, and transmission of signals.

19. An overcurrent and short-circuit protection device for at least one power semiconductor device, comprising:

a current detector operatively connected to detect output currents of said at least one semiconductor device and transmit current signals responsively to said output currents;

a first circuit operatively connected to receive said current signals and to transmit a first error signal when a positive maximum instantaneous value of said current signals exceeds a first threshold value or when a negative maximum instantaneous value of said current values exceeds a second threshold value;

a second circuit operatively connected to receive said current signals and to transmit a second error signal when a sum of said current signals is less than a minimum threshold value or more than a maximum threshold value; and a switch operatively connected to receive said first error signal and said second error signal and to interrupt an operation of said at least one semiconductor device responsive to said first circuit and said second circuit.

20. The overcurrent and short-circuit protection device of claim 19 wherein:

said first circuit includes an n-fold bridge rectifier to determine said positive maximum instantaneous value and said negative maximum instantaneous value from said actual current signal and a first comparator to transmit said first error signal when said positive maximum instantaneous value exceeds a first threshold value or when said negative maximum instantaneous value exceeds a second threshold value; and said second circuit includes a summation amplifier to determine said sum of said actual current signals and a second comparator to transmit said second error signal when said sum of actual current signals is less than a minimum threshold value or more than a maximum threshold value.

21. The overcurrent and short-circuit protection device of claim 20, wherein said current detector requires 1 $\mu$s for acceptance, processing, and transmission of actual current signals and each of said summation amplifier, said first comparator, said n-fold bridge rectifier, said second comparator, and said circuit interrupter require less than 0.5 $\mu$s for acceptance, processing, and transmission of signals.

* * * * *